US010983831B2

(12) United States Patent
Milojicic et al.

(10) Patent No.: US 10,983,831 B2
(45) Date of Patent: *Apr. 20, 2021

(54) FIRMWARE-BASED PROVISIONING OF OPERATING SYSTEM RESOURCES

(71) Applicant: HEWLETT PACKARD ENTERPRISE DEVELOPMENT LP, Houston, TX (US)

(72) Inventors: Dejan S. Milojicic, Palo Alto, CA (US); Derek Schumacher, Roseville, CA (US); Zhikui Wang, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 115 days.

This patent is subject to a terminal disclaimer.

(21) Appl. No.: 16/058,506

(22) Filed: Aug. 8, 2018

(65) Prior Publication Data
US 2020/0050493 A1 Feb. 13, 2020

Related U.S. Application Data

(63) Continuation of application No. 15/500,083, filed as application No. PCT/US2014/069625 on Dec. 10, 2014, now Pat. No. 10,067,795.

(51) Int. Cl.
G06F 9/46 (2006.01)
G06F 9/50 (2006.01)
G06F 9/48 (2006.01)
G06F 9/4401 (2018.01)
G06F 11/22 (2006.01)
G06F 9/54 (2006.01)

(52) U.S. Cl.
CPC .......... *G06F 9/5044* (2013.01); *G06F 9/4401* (2013.01); *G06F 9/4843* (2013.01); *G06F 9/545* (2013.01); *G06F 11/2236* (2013.01); *G06F 2209/5011* (2013.01)

(58) Field of Classification Search
None
See application file for complete search history.

(56) References Cited

U.S. PATENT DOCUMENTS

| 7,644,393 | B2 | 1/2010 | Glerum et al. |
| 8,213,871 | B1 | 7/2012 | Cogan et al. |
| 2008/0216085 | A1 | 9/2008 | Arndt et al. |
| 2011/0179422 | A1 | 7/2011 | Stegaru et al. |
| 2012/0096167 | A1 | 4/2012 | Free et al. |

(Continued)

OTHER PUBLICATIONS

Alipour et al~"A Contextual Approach Towards More Accurate Duplicate Bug Report Detection"~http://softwareprocess.es/a/bugdedup.pdf >~2014~10 pages.

(Continued)

*Primary Examiner* — Gregory A Kessler

(57) ABSTRACT

Examples relate to firmware-based provisioning of hardware resources. In some of the examples, firmware discovers and takes ownership of a hardware resource. At this stage, the firmware performs a test to verify the hardware resource. The firmware then assigns the hardware resource to an OS instance. At this stage, the firmware can suspend assigning further hardware resources to the OS instance in response to a satisfied notification from the OS instance.

25 Claims, 3 Drawing Sheets

(56) References Cited

U.S. PATENT DOCUMENTS

2012/0158923 A1    6/2012    Mohamed et al.
2013/0219161 A1    8/2013    Fontignie et al.

OTHER PUBLICATIONS

International Searching Authority, The International Search Report and the Written Opinion, PCT/US2014/069625, dated Jul. 21, 2015, 10 Pages.

Sun et al~Towards More Accurate Retrieval of Duplicate Bug Reports~chengniansun.bitbucket.org/papers/ase11.pdf >~2014~10 pages.

Wang et al, An Approach to Detecting Duplicate Bug Reports Using Natural Language and Execution Information, http://sei.pku.edu.cn/wangxy06/icse08.pdf >, 2008, 10 pages.

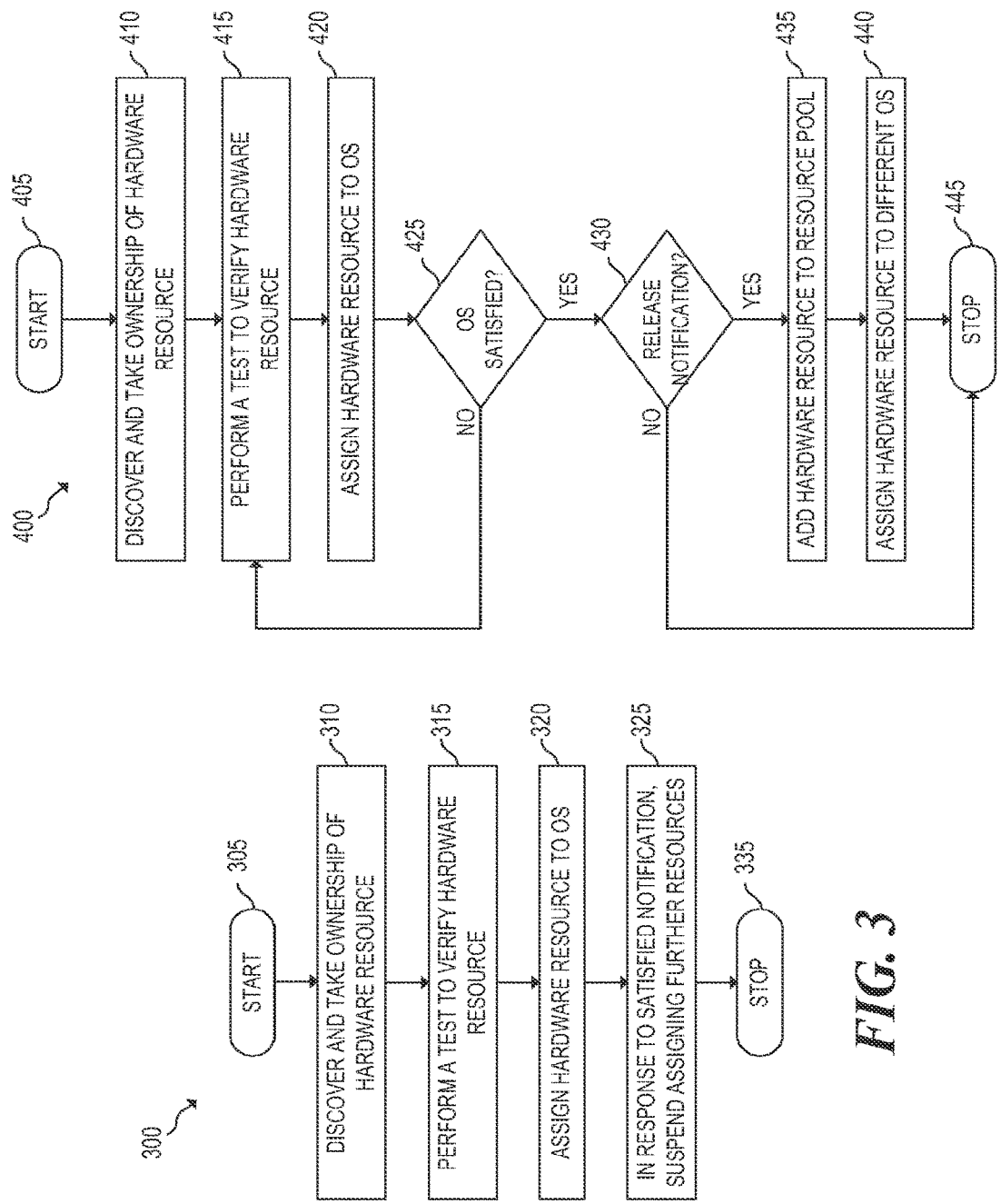

FIRMWARE-BASED PROVISIONING OF OPERATING SYSTEM RESOURCES

CROSS REFERENCE TO RELATED APPLICATION

This application is a continuation of co-pending U.S. patent application Ser. No. 15/500,083, filed Jan. 30, 2017, which claims priority to PCT Application Serial No. PCT/US2014/069625, filed Dec. 10, 2014. The entire contents of both are hereby incorporated by reference as though fully set forth herein.

BACKGROUND

In many-core, rack-size systems with large amounts of high-performance, high-density, low-cost non-volatile memory, resource provisioning can be quite complex. Further, such systems can be partitioned and run different operating systems (OS's). An OS holds ownership of a set of resources after the OS is booted.

BRIEF DESCRIPTION OF THE DRAWINGS

The following detailed description references the drawings, wherein:

FIG. 3 is a flowchart of an example method for execution by a server computing device for firmware-based provisioning of hardware resources; and FIG. 4 is a flowchart of an example method for execution by a server computing device for firmware-based provisioning of hardware resources.

DETAILED DESCRIPTION

As discussed above, the management of systems' resources becomes more complex as computer systems grow in size and complexity. In particular, there are numerous (potentially heterogeneous) cores, multiple heterogeneous memories (dynamic random access memory (DRAM), non-volatile memory (NVM)) that are distributed across local and remote nodes, and rack-size computers that can cross multiple rack boundaries. Firmware initially controls the system, tests all resources, boots an OS, and then passes the resource control to the OS. During operation, firmware may occasionally execute some of the privileged functionality on behalf of the OS, but the firmware does not have an active role.

Examples described herein include firmware that plays an active role in managing and owning all resources and gradually provisioning resources to OS's as requested by the OS's. Further, the firmware can also recover resources when they are no longer used by the OS or according to some resource sharing policy.

In some examples, firmware discovers and takes ownership of a hardware resource. Next, the firmware performs a test to verify the hardware resource while an OS instance is booting. The firmware then assigns the hardware resource to the OS instance. At this stage, the firmware can suspend assigning further hardware resources to the OS instance in response to a satisfied notification from the OS instance.

Figure 1:
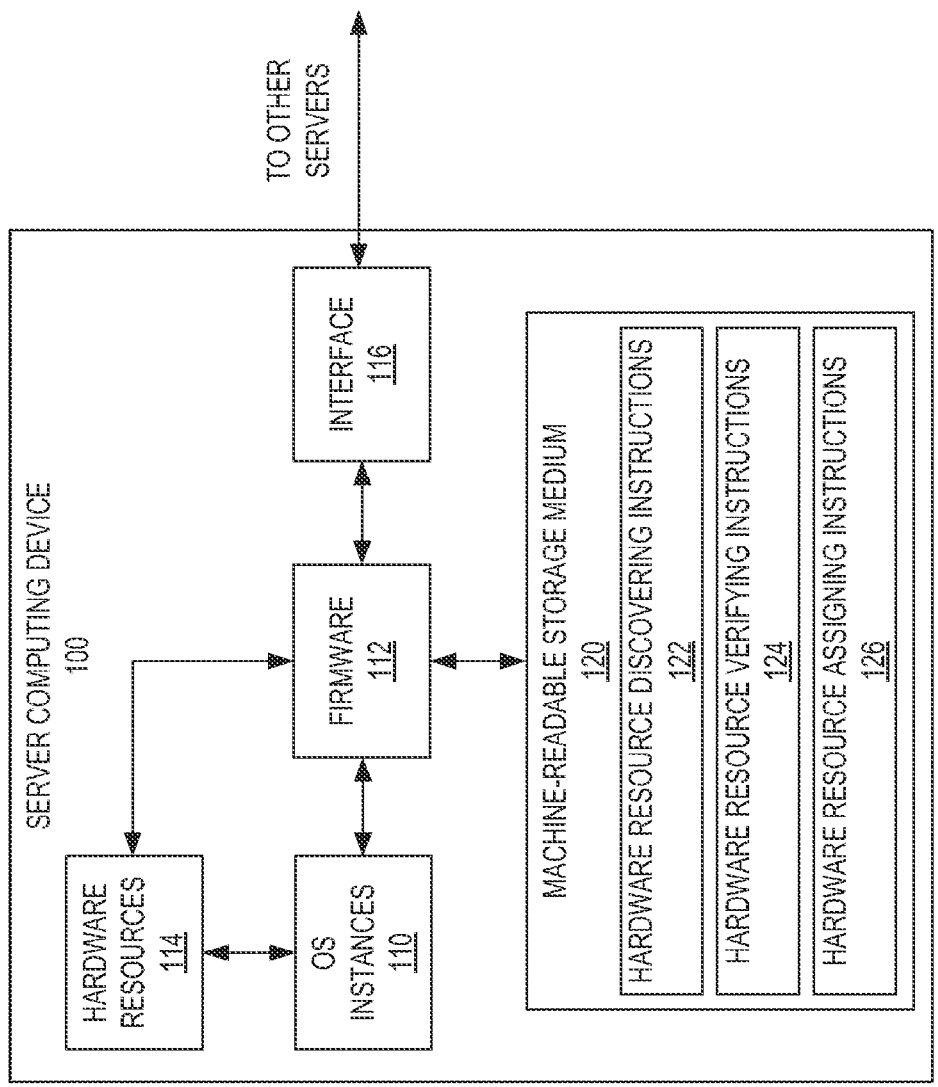
FIG. 1 is a block diagram of an example server computing device for firmware-based provisioning of hardware resources.

Referring now to the drawings, FIG. 1 is a block diagram of an example server computing device 100 for firmware-based provisioning of hardware resources. The example server computing device 100 may be implemented as a rack-mount server, a desktop computing device, server, or other computing device capable of providing multiple OS environments. In the example of FIG. 1, server computing device 100 includes OS instance(s) 110, firmware 112, hardware resource(s) 114, interface 116, and machine-readable storage medium 120.

OS instance 110 is partitioned computing system within server computing device 100 that provides the architecture and functions of a separate computer system. Any number of OS instances 110 can be included in server computing device 100, where each OS instance 110 executes as if it were a separate computer system (i.e., hardware resources 114 are partitioned between the OS instances 110). Each OS instance may have varied characteristics such as different operating systems, different proportions of hardware resources, different system requirements, different hardware profiles, etc.

Firmware 112 includes persistent memory and executable code that is embedded in a computing component such as a basic input/output system (BIOS). Examples of persistent memory used for firmware 112 include, but are not limited to, read-only memory (ROM), erasable programmable read only memory (EPROM), and flash memory. The persistent memory is programmed using a firmware image that is flashed or otherwise installed onto the firmware 112. BIOS firmware typically includes elementary functions for booting and initializing a computing device; however, firmware 112 has been expanded as described below to provide additional functionality for dynamically provisioning hardware resources 114.

Hardware resources 114 can include various resources of server computing device 100 that can be assigned to OS instances 110. Examples of hardware resources 114 include, but are not limited to, processors/cores, memory, networking ports, etc. In some cases, hardware resources 114 can be virtualized such that a single hardware resource can be virtually shared among multiple OS instances 110. A processor may be one or more central processing units (CPUs), microprocessors, and/or other hardware devices suitable for retrieval and execution of instructions.

Interface 116 may include a number of electronic components for communicating with other server devices. For example, interface 116 may be an Ethernet interface, a Universal Serial Bus (USB) interface, an IEEE 1394 (Firewire) interface, an external Serial Advanced Technology Attachment (eSATA) interface, or any other physical connection interface suitable for communication with the other server devices. In another example, interface 116 may be a wireless interface.

Machine-readable storage medium 120 may be any electronic, magnetic, optical, or other physical storage device that stores executable instructions. Thus, machine-readable storage medium 120 may be, for example, Random Access Memory (RAM), ROM, EEPROM, flash memory, a storage drive, an optical disc, and the like. As described in detail below, machine-readable storage medium 120 may be encoded with executable instructions for firmware-based provisioning of hardware resources. In this example, instructions stored on machine-readable storage medium 120 are executed by a processor as described below.

Hardware resource discovering instructions 122 may discover hardware resources 114 while server computing device 100 is booting. BIOS firmware 112 discovers and tests hardware resources 114 during boot to determine if the hardware resources 114 are operating properly. Similarly, in this example, the firmware 112 locates and examines hardware resources 114 during boot to discover the amount and characteristics of the available hardware resources 114.

Hardware resource verifying instructions 124 may examine the hardware resources 114 to confirm they are operating properly. Specifically, firmware 112 may test RAM of server computing device 100 to determine if the RAM is operational (i.e., can be written to and read from). Firmware 112 may also test processors of server computing device 100 to ensure the processors are able to execute instructions. If hardware resources 114 are not operating properly, firmware 112 may interrupt the booting of server computing device 100 and post an appropriate error code that identifies the issue.

Hardware resource assigning instructions 126 assigns hardware resources 114 to OS instances 110. While server computing device 100 is booting, firmware 112 allocates and assigns subsets of hardware resources 114 to specific OS instances 110. For example, the assignments can be made by firmware 112 according to configurations specified by an administrator of server computing device 100. In another example, OS instances 110 may request a quantity of resources 114, where firmware 112 satisfies the requests by appropriately assigning resources from the resource pool. In this manner, the different requirements of each OS instance 110 can be satisfied by the assignment of hardware resources 114 while the server computing device 100 is booting.

Figure 2:
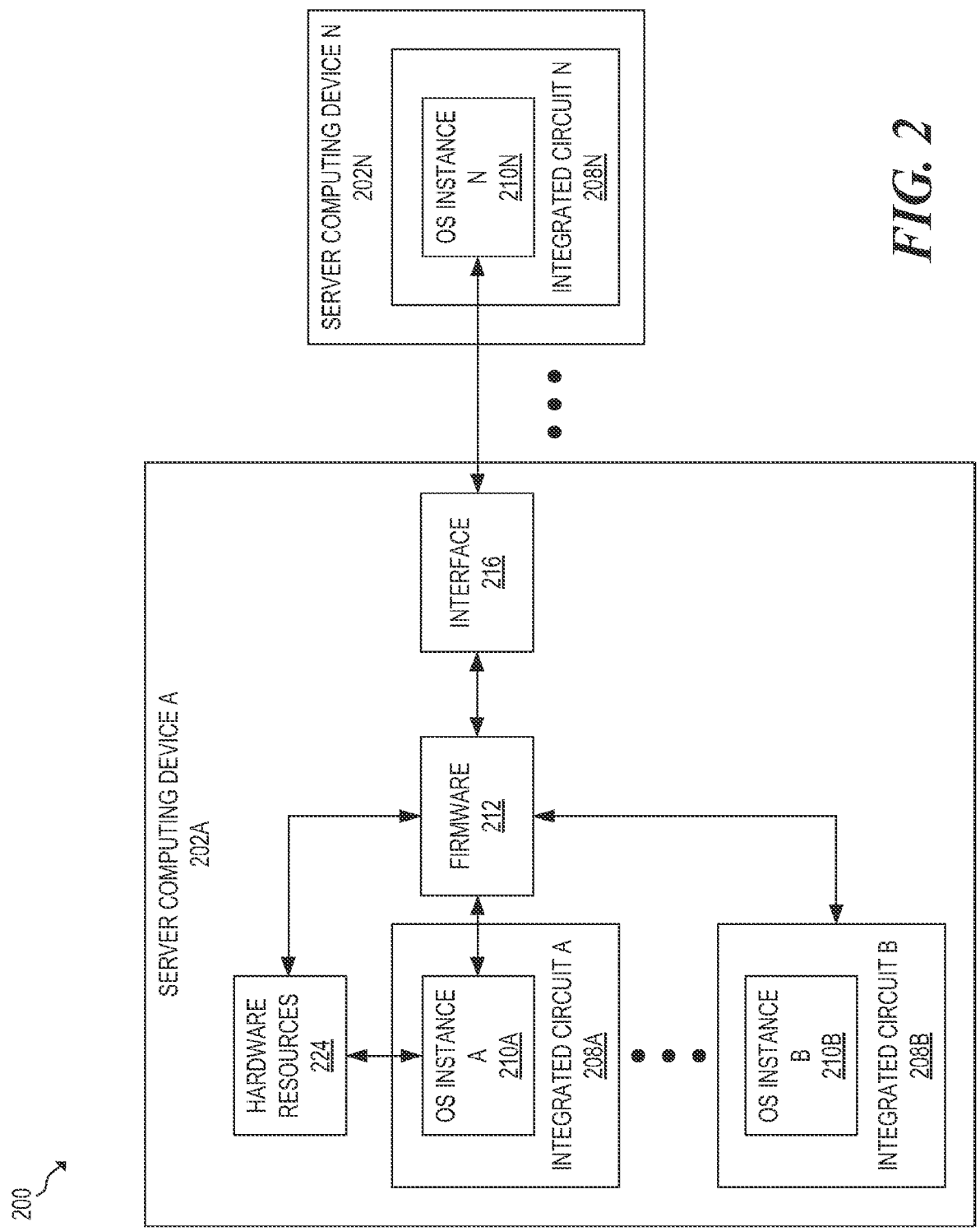
FIG. 2 is a block diagram of an example system including multiple server computing devices for firmware-based provisioning of hardware resources.

FIG. 2 is a block diagram of an example system 200 including server computing devices (e.g., server computing device A 202A, server computing device N 202N) that allow for firmware-based provisioning of hardware resources. The components of the server computing devices may be similar to the corresponding components of server computing device 100 described with respect to FIG. 1.

As illustrated, server computing device A 202A includes integrated circuits (i.e., chips) 208A, 208B, firmware 212, interface 216, and hardware resources 224. Interface 216 and hardware resources 224 may be similar to the corresponding components of server computing device 100 that are described above with respect to FIG. 1. Each integrated circuit 208A, 208B includes an OS instance 210A, 210B, respectively, which may be similar to the corresponding OS instances 110 of server computing device 100 of FIG. 1. Firmware 212 may be similar to the corresponding firmware 112 of server computing device 100 of FIG. 1.

In this example, firmware 212 uses interface 216 to communicate with other server computing devices (e.g., server computing device N 202N, etc.). Integrated circuit A 208A corresponds to a management circuit because it includes firmware 212. Firmware 212 is configured to allocate resources to different OS instances 210A, 210B, 210N in different integrated circuits (e.g., integrated circuit B 208B, etc.) server computing device A 202A and even remote integrated circuits (e.g., integrated circuit 208N, etc.) of other server computing device N 202N. Specifically, firmware 212 can allocate resources dynamically while server computing device 202A is booting and/or after boot while OS instances 210A, 210B are running. In other words, firmware 212 is configured to centrally manage hardware resources 224 of server computing device A 202A. For example, firmware 212 may disable hardware resources 224 to optimize for power saving, allocate hardware resources 224 to different OS instances 210A, 210B, 210N to balance the load, set hardware resources 224 to be idle or deactivated for maintenance purpose, react to security threats, etc. In some cases, firmware 212 can also be configured to manage hardware resources of other server computing devices such as server computing device N 202N.

In some cases, firmware 212 allocates hardware resources 224 by invoking low-level commands to either assign resources to or recapture resources from OS instances 210A, 210B, 210N. Firmware 212 may recapture hardware resources 224 from an OS instance by simply reassigning the hardware resources 224 to a different OS instance. Further, such functions or primitives as described above can be accomplished through techniques, such as ballooning to regain ownership of memory or containers and partitioning techniques to regain the ownership of cores.

In other cases, OS instances 210A, 210B, 210N may request hardware resources 224 actively and firmware 212 can decide if the requests should be satisfied. In this case, the OS instances 210A, 210B, 210N can release hardware resources 224 back to resource pools that are managed by firmware 212.

In yet other cases, firmware 212 may be configured to incrementally test hardware resources 224 and pass the hardware resources 224 as soon as they are tested to the OS instances 210A, 210B, 210N during the bootstrap process to optimize performance and improve the bootstrap time (i.e., availability of the system). In such cases, firmware 212 testing the system is accomplished in parallel with the OS instances 210A, 210B, 210N booting. In other words, OS instances 210A, 210B initially run with minimal resources and then gradually receive additional resources 224 from firmware 212 as it continues to test and configure the hardware resources 224.

In yet other cases, firmware 212 may be configured to gradually bootstrap an OS instance A 210A from increasingly further memory locations with respect to a management core of the OS instance A 210A (i.e., firmware 212 initially assigns resources that are closest to OS instance A 210A and then gradually begins to assign resources that are farther away from OS instance A 210A). Initially, firmware 212 boots OS instance A 210A from the non-volatile memory (NVM), which is on the same integrated circuit 208A as the management core of OS instance A 210A. But instead (if for example that memory has failed) or in addition (due to the size, or subsequent changes), the bootstrap can be redirected to NVM on a different integrated circuit 208B. Similarly, the bootstrap can be redirected even further to NVM on yet another server computing device N 202N to which the management core has load-store access. In each case, security and accessibility should be established (e.g., access rights and mapping of a memory management unit (MMU) of server computing device A 202A should be set to be able to access memory on an a different integrated circuit than OS instance A 210A or on a different server).

FIG. 3 is a flowchart of an example method 300 for execution by a server computing device 100 for firmware-based provisioning of hardware resources. Although execution of method 300 is described below with reference to server computing device 100 of FIG. 1, other suitable devices for execution of method 300 may be used, such as server computing devices 202A, 202N of FIG. 2. Method 300 may be implemented in the form of executable instructions stored on a machine-readable storage medium, such as computer readable medium 120 of FIG. 1, and/or in the form of electronic circuitry.

Method 300 may start in block 305 and continue to block 310, where firmware of server computing device 100 discovers and takes ownership of hardware resources. In block 315, the firmware verifies the hardware resources to confirm they are operating properly.

In block 320, the firmware assigns hardware resources to OS instances of server computing device 100. Server computing device 100 may include any number of OS instances, and the firmware may apportion the hardware resources between the OS instances dynamically based on system requirements and/or statically based on a configuration file. In block 325, the firmware may suspend assigning further hardware resources to a particular OS instance in response to a satisfied notification from the machine. In other words, the firmware is configured to incrementally assign resources to the OS instance until the OS instance sends the satisfied notification. In other examples, the firmware may suspend assigning further hardware resources based on a preconfigured policy such as a load-balancing policy. Method 300 may then proceed to block 335, where method 300 stops.

FIG. 4 is a flowchart of an example method 400 for execution on a server computing device 202A for firmware-based provisioning of hardware resources. Although execution of method 400 is described below with reference to server computing device 202A of FIG. 2, other suitable devices for execution of method 400 may be used, such as server computing device 100 of FIG. 1. Method 400 may be implemented in the form of executable instructions stored on a machine-readable storage medium and/or in the form of electronic circuitry.

In block 410, firmware of server computing device 202A discovers and takes ownership of hardware resources. In block 415, the firmware verifies the hardware resources to confirm they are operating property.

In block 420, the firmware assigns hardware resources to an OS instance of server computing device 202A. Server computing device 202A may include any number of OS instances, and the firmware may apportion the hardware resources to the OS instance dynamically based on system requirements and/or statically based on a configuration file. In block 425, the firmware determines if the OS instance is satisfied with the hardware resources it has been assigned. For example, the firmware may determine if a satisfaction notification has been received from the OS instance. In another example, the firmware may determine if the OS instance is satisfied based on a preconfigured policy.

If the OS instance is not satisfied, method 400 may return to block 415 to continue verifying hardware resources for assignment. In this example, hardware resources are assigned as they are verified to reduce boot time (i.e., hardware resources are verified and assigned in parallel). Accordingly, hardware resources can be incrementally assigned to the OS instance as they are verified in segments.

If the OS instance is satisfied, method 400 proceeds to block 430, where the firmware may determine if a release notification has been received. For example, the OS instance may send a release notification when it no longer needs hardware resources because the OS instance's load has decreased or because the OS instance is suspending or shutting down. In another example, the firmware can initiate recapturing the hardware resources based on a preconfigured policy (e.g., load-balancing policy, etc.). If a release notification is received, the firmware adds the previously assigned hardware resources back to a resource pool in block 435. Because the hardware resources have been assigned to the resource pool, the firmware can then assign the hardware resources to a different OS instance in block 440. In this manner, the firmware continues to centrally manage the de-allocation and allocation of hardware resources between OS instances. In block 445, method 400 may stop.

The foregoing disclosure describes a number of examples for firmware-based provisioning of hardware resources. In this manner, the examples disclosed herein facilitate centralized management of hardware resources between OS instances by configuring firmware of a server to manage the hardware resources during and after bootstrapping.

We claim:

1. A system for firmware-based provisioning of hardware resources, comprising:
   a hardware resource selected from a plurality of hardware resources in a resource pool, wherein each of the hardware resources in the resource pool are not pre-determined to be associated with a particular OS instance;
   an OS instance operatively connected to the hardware resource;
   firmware operatively connected to the hardware resource, the firmware to:
      discover and take ownership of the hardware resource;
      perform a test to verify the hardware resource; and
      assign the hardware resource to the OS instance after verification of the hardware resource.

2. The system of claim 1, wherein the firmware is further to recapture the hardware resource from the OS instance upon determination that the hardware resource may be returned to the resource pool.

3. The system of claim 1, wherein the firmware is further to redirect a bootstrap of the OS instance to memory on a different chip than the OS instance.

4. The system of claim 1, wherein the firmware is further to, assign additional hardware resources to the OS instance as each of the additional hardware resources are determined to pass a corresponding verification test.

5. The system of claim 1, wherein the OS instance is located on a different chip than the firmware.

6. The system of claim 1, wherein the OS instance is one of a plurality of OS instances, and wherein the plurality of OS instances are distributed across a plurality of server computing devices.

7. A method for firmware-based provisioning of hardware resources, comprising:
   discovering, by firmware, and taking ownership of a hardware resource selected from a plurality of hardware resources in a resource pool, wherein each of the hardware resources in the resource pool are not pre-determined to be associated with a particular OS instance;
   performing, by the firmware, a test to verify the hardware resource;
   assigning, by the firmware, the hardware resource to an OS instance of a plurality of OS instances operatively connected to the firmware after verification of the hardware resource.

8. The method of claim 7, further comprising redirecting, by the firmware, a bootstrap of the OS instance to memory on a different chip than the firmware.

9. The method of claim 7, further comprising:
   adding, by the firmware, the hardware resource to a resource pool for allocation to other OS instances from the plurality of OS instances in response to a release notification from the OS instance;
   revoking, by the firmware, access to the hardware resource by the OS instance; and maintaining ownership of the hardware resource by the firmware until a next assignment of the hardware resource to one of the plurality of OS instances.

10. The method of claim 7, wherein the OS instance is located on a different chip than the firmware.

11. The method of claim 7, wherein the plurality of OS instances are distributed across a plurality of server computing devices.

12. A non-transitory machine-readable storage medium encoded with instructions executable by a processor for firmware-based provisioning of hardware resources, the machine-readable storage medium comprising instructions to:

discover, by firmware, and take ownership of a hardware resource selected from a plurality of hardware resources in a resource pool, wherein each of the hardware resources in the resource pool are not pre-determined to be associated with a particular OS instance;

perform, by the firmware, a test to verify the hardware resource;

assign, by the firmware and after successfully completing the test to verify, the hardware resource to an OS instance of a plurality of OS instances that are distributed across a plurality of server computing devices.

13. The non-transitory machine-readable storage medium of claim 12, wherein the instructions are further to recapture, by the firmware, the hardware resource from the OS instance.

14. The non-transitory machine-readable storage medium of claim 12, wherein the instructions are further to redirect, by the firmware, a bootstrap of the OS instance to memory on a different chip than the firmware.

15. The non-transitory machine-readable storage medium of claim 12, wherein the instructions are further to add, by the firmware, the hardware resource to a resource pool for allocation to other OS instances in response to a release notification from the OS instance.

16. The non-transitory machine-readable storage medium of claim 12, wherein the instructions are further to assign additional hardware resources to the OS instance as each of the additional hardware resources are determined to pass a corresponding verification test.

17. The non-transitory machine-readable storage medium of claim 12, wherein the instructions are further to disable selected unassigned hardware resources from the resource pool for power savings.

18. The non-transitory machine-readable storage medium of claim 12, wherein the instructions are further to allocate resources to different OS instances executing in remote integrated circuits of a server device not including the firmware.

19. The non-transitory machine-readable storage medium of claim 12, wherein the OS instance is one of a plurality of OS instances, and wherein the plurality of OS instances are distributed across a plurality of server computing devices.

20. The non-transitory machine-readable storage medium of claim 12, wherein the OS instance is initializing and not fully operational for at least one assignment of one of the plurality of hardware resources.

21. The non-transitory machine-readable storage medium of claim 12, wherein the test to verify is performed in parallel with the OS instance initialization.

22. The system of claim 1, wherein the firmware is further to disable selected unassigned hardware resources from the resource pool for power savings.

23. The system of claim 1, wherein the OS instance is initializing and not fully operational for at least one assignment of one of the plurality of hardware resources.

24. The system of claim 1, wherein the test to verify is performed in parallel with the OS instance initialization.

25. The method of claim 7, wherein the OS instance is initializing and not fully operational for at least one assignment of one of the plurality of hardware resources.

* * * * *